United States Patent [19]
Saito et al.

[11] Patent Number: 5,910,552
[45] Date of Patent: Jun. 8, 1999

[54] FLUORINE-CONTAINING COPOLYMER ELASTOMER PROCESS FOR PRODUCING THE SAME AND COMPOSITION CONTAINING THE SAME

[75] Inventors: Satoru Saito, Kitaibaraki; Haruyoshi Tatsu, Hitachi, both of Japan

[73] Assignee: Nippon Mektron, Limited, Tokyo, Japan

[21] Appl. No.: 08/818,819

[22] Filed: Mar. 14, 1997

[30] Foreign Application Priority Data

Apr. 24, 1996 [JP] Japan .................................. 8-127863

[51] Int. Cl.⁶ .................................................. C08F 16/24
[52] U.S. Cl. ........................................... 526/247; 526/206
[58] Field of Search ................................ 526/247, 206

[56] References Cited

U.S. PATENT DOCUMENTS

| | | | |
|---|---|---|---|
| 3,692,843 | 9/1972 | Resnick . | |
| 4,035,565 | 7/1977 | Apotheker et al. | 526/247 |
| 4,281,092 | 7/1981 | Breazeale | 526/247 |
| 4,564,667 | 1/1986 | Albin et al. . | |
| 4,745,165 | 5/1988 | Arcella et al. | 526/247 |
| 4,948,853 | 8/1990 | Logothetis | 526/247 |
| 4,973,633 | 11/1990 | Moore | 526/247 |
| 4,973,634 | 11/1990 | Logothetis | 526/247 |
| 4,983,697 | 1/1991 | Logothetis | 526/247 |
| 5,032,655 | 7/1991 | Moore | 526/247 |
| 5,037,921 | 8/1991 | Carlson | 526/247 |
| 5,102,965 | 4/1992 | Carlson | 526/247 |

FOREIGN PATENT DOCUMENTS

| | | | |
|---|---|---|---|
| 0075312 | 3/1983 | European Pat. Off. | 526/247 |
| 0131308 | 1/1985 | European Pat. Off. | 526/247 |
| 0338755 | 10/1989 | European Pat. Off. | 526/247 |
| 61-51324 | 12/1986 | Japan . | |
| 56-163105 | 7/1987 | Japan . | |
| 63-25003 | 5/1988 | Japan . | |
| 7-285948 | 10/1995 | Japan . | |

*Primary Examiner*—Jeffrey T. Smith
*Assistant Examiner*—N. Sarofim
*Attorney, Agent, or Firm*—Kenyon & Kenyon

[57] ABSTRACT

A novel fluorine-containing copolymer elastomer having bromine groups as cross-linkable groups, which comprises about 45 to about 80% by mole of tetrafluoroethylene, about 50 to about 20% by mole of a perfluoro(vinylether) represented by the following general formula:

$$CF_2=CFO(CF_2)_2(OCF_2)nOCF_3$$

where n is an integer of 1 to 5, and about 0.2 to about 5% by mole of a bromine-containing unsaturated monomer compound, sum total being 100% by mole, gives vulcanization products having distinguished resistances to chemicals, low temperature and heat.

5 Claims, No Drawings

FLUORINE-CONTAINING COPOLYMER ELASTOMER PROCESS FOR PRODUCING THE SAME AND COMPOSITION CONTAINING THE SAME

BACKGROUND OF THE INVENTION

1. Field of the Invention

The present invention relates to a fluorine-containing copolymer elastomer, a process for producing the same and a composition containing the same, and more particularly to a novel fluorine-containing copolymer elastomer having bromine groups as cross-linkable groups, which can give vulcanization products having distinguished resistances to chemicals, low temperature and heat, a process for producing the same and a composition containing the same.

2. Description of Related Art

Fluorine-containing elastomers prepared by copolymerization of tetrafluoroethylene with perfluoro(methyl vinyl ether) have distinguished resistances to chemicals and heat, and thus are used as various machine parts such as O-rings, diaphragms, etc. at positions requiring higher resistances to chemicals and heat. However, these fluorine-containing elastomers have a poor resistance to low temperature and accordingly are not applicable to positions requiring a resistance to low temperature.

To improve the resistance to low temperature, while maintaining high resistances to chemicals and heat, it was proposed to replace the $CF_3$ group of perfluoro(methyl vinyl ether) $CF_2=CFOCF_3$ with a perfluoroalkyl group having an ether bond.

One known example thereof is copolymerization of tetrafluoroethylene with a compound having the following general formula:

$$CF_2=CFO[CF_2CF(CF_3)O]nC_3F_7$$

as disclosed in JP-B-61-57324, JP-B-62-34246, JP-B-63-25003, JP-A-60-23407, etc., where no improvement of the resistance to low temperature as desired for the copolymer was obtained without the n value larger from the viewpoint of molecular structure, whereas a larger n value made the molecular weight larger and consequently considerably lowered the polymerizability. This was a serious disadvantage.

To improve the resistance to low temperature, it was also proposed to add a plasticizer such as a perfluoropolyether compound represented by the following general formula:

$$RfO[CF(CF_3)CF_2O]nRf'$$

where Rf and Rf' each are a perfluoroalkyl group, to the fluorine rubber. Addition of such a plasticizer improve the resistance to low temperature of fluorine rubber vulcanization products, but the plasticizer tend to bleed out of the vulcanization product surfaces and dissipate when used under high temperature conditions for a long time, and thus the resistance to low temperature is gradually lost. Even at a relatively low service temperature, dissipation of the plasticizer is not negligible under high vacuum conditions.

Furthermore, the resistance to low temperature can be improved by blending with other elastomer having a good resistance to low temperature, for example, fluorosilicone rubber, but the preferable proper characteristics such as resistance to chemicals will be deteriorated.

SUMMARY OF THE INVENTION

An object of the present invention is to provide a novel fluorine-containing copolymer elastomer having bromine groups as cross-linkable groups, which can give vulcanization products having distinguished resistances to chemicals, low temperature and heat.

The present invention provides a fluorine-containing copolymer elastomer, which comprises about 45 to about 80% by mole of tetrafluoroethylene, about 50 to about 20% by mole of a perfluoro(vinylether) represented by the following general formula:

$$CF_2=CFO(CF_2)_2(OCF_2)nOCF_3$$

where n is an integer of 1 to 5, and about 0.2 to about 5% by mole of a bromine-containing unsaturated monomer compound, sum total being 100% by mole.

DETAILED DESCRIPTION OF THE INVENTION

Perfluoro(vinylether) represented by the above-mentioned general formula can be prepared through a series of steps as follows:

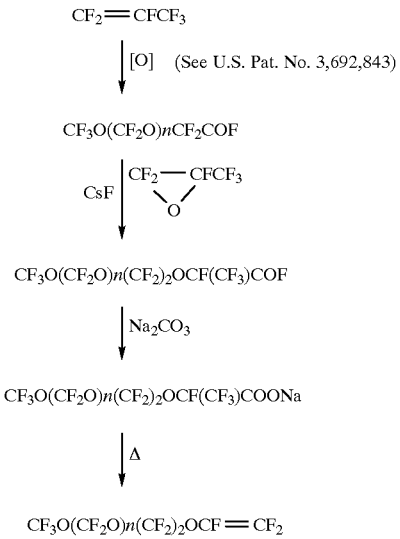

Bromine-containing unsaturated monomer compound for use in forming cross-linkable sites includes, for example, brominated vinyl compounds or brominated olefins such as vinyl bromide, 1-bromo-2,2-difluoroethylene, perfluoroallyl bromide, 4-bromo-1,1,2-trifluorobutene-1,4-bromo-3,3,4,4-tetrafluorobutene-1,4-bromo-1,1,3,3,4,4-hexafluorobutene-1, bromotrifluoroethylene, 4-bromo-3-chloro-1,1,3,4,4-pentafluorobutene-1,6-bromo-5,5,6,6-tetrafluorohexene-1, 4-bromoperfluorobutene-1,3,3-difluoroallyl bromide, etc., preferably, a bromine-containing vinyl ether represented by the following general formula is used:

$$BrRf—O—CF=CF_2$$

where BrRf is a bromine-containing perfluoroalkyl group having 2 to 5 carbon atoms.

The bromine-containing vinyl ether for use in the present invention includes, for example, $CF_2BrCF_2OCF=CF_2$, $CF_2Br(CF_2)_2OCF=CF_2$, $CF_2Br(CF_2)_3OCF=CF_2$, $CF_3CFBr(CF_2)_2OCF=CF_2$, $CF_2Br(CF_2)_4OCF=CF_2$, etc. Details of these compounds are disclosed in U.S. Pat. No. 4,745,165.

Besides, bromine-containing vinyl ethers presented by the following general formula, etc. as disclosed in U.S. Pat. No. 4,564,662, can be used in the present invention:

ROCF=CFBr, or ROCBr=CF₂ where R is a lower alkyl group or a fluoroalkyl group.

These individual monomer compounds can form fluorine-containing copolymer elastomers together with tetrafluoroethylene. In the resulting copolymers, (A) about 45 to about 80% by mole, preferably about 55 to about 75% by mole of tetrafluoroethylene, (B) about 50 to about 10% by mole, preferably about 45 to about 20% by mole of perfluoro(vinyl ether) and (C) about 0.2 to about 5% by mole, preferably about 0.3 to about 3% by mole of a bromine-containing unsaturated monomer compound are subjected to copolymerization, respectively, the sum total being 100% by mole. In case of the component (A) monomer, copolymerization above about 80% by mole no more forms any elastomeric copolymer. In case of the component (B) monomer, copolymerization below about 10% by mole shows no more improvement of low temperature resistance, whereas above about 50% by mole not only cost will be increased, but also yield of polymerization will be lowered and vulcanization products will have a poor heat resistance. In case of the component (C) cross-linkable monomer, copolymerization below about 0.2% by mole fails to attain the desired cross-linking, whereas above 4% by mole cost will be increased and the heat resistance will be deteriorated.

Mainly to attain the cost reduction, these terpolymers can be further copolymerized with fluorinated olefins, various olefin compounds, vinyl compounds, etc. to such a degree as not to inhibit the copolymerization reaction and deteriorate physical properties of vulcanization products (e. g. to not more than about 20% by mole). Fluorinated olefins include, for example, vinylidene fluoride, monofluoroethylene, trifluoroethylene, trifluoropropylene, pentafluoropropylene, hexafluoropropylene, hexafluoroisobutylene, chlorotrifluoroethylene, dichlorodifluoroethylene, etc. Olefin compounds and vinyl compounds include, for example, ethylene, propylene, 1-butene, isobutylene, methyl vinyl ether, ethyl vinyl ether, butyl vinyl ether, cyclohexyl vinyl ether, vinyl acetate, vinyl propionate, vinyl chloride, vinylidene chloride, trifluorostyrene, etc. Among them, at least one of vinylidene fluoride, trifluoroethylene, hexafluoropropylene, chlorotrifluoroethylene, methyl vinyl ether, etc. can be preferable used. Furthermore, perfluoro (vinylether) compounds such as perfluoro(methyl vinyl ether), perfluoro(ethyl vinyl ether), perfluoro(propyl vinyl ether), etc. can be also used for this purpose.

The copolymer can be further copolymerized with a small amount, for example, not more than about 1% by mole, of a fluorine-containing diene compound. The fluorine-containing diene compound for use in the present invention includes, for example, fluorine-containing diene compounds having 4 to 8 carbon atoms, such as perfluoro(1,3-butadiene), perfluoro(1,4-pentadiene), 1,1,2-trifluoro-1,3-butadiene, 1,1,2-trifluoro-1, 4-pentadiene, 1,1,2,3,3-pentafluoro-1,4-pentadiene, perfluoro(1,7-octadiene), perfluoro(divinyl ether), perfluoro(allyl vinyl ether), perfluoroallyl vinyl ether, perfluorovinyl vinyl ether, etc.

Copolymerization reaction can be carried out according to any polymerization method, for example, by emulsion polymerization, suspension polymerization, solution polymerization, bulk polymerization, etc., among which the emulsion polymerization method is preferable from a higher polymerization degree and the economical viewpoints. The emulsion polymerization reaction can be carried out generally at a temperature of about 20 to about 80° C. under a pressure of about 0 to about 20 kg/cm² gauge, using a water-soluble inorganic peroxide such as ammonium persulfate, etc. or its redox system as a catalyst and also using an emulsifier such as ammonium perfluorooctanoate, ammonium perfluoroheptanoate and ammonium perfluorononanoate or their mixture, preferably ammonium perfluorooctanoate. To adjust pH in the polymerization system a buffering electrolyte such as $Na_2HPO_4$, $NaH_2PO_4$, $KH_2PO_4$, etc. or NaOH can be also used.

The copolymerization reaction can be also carried out preferably in the presence of a chain transfer agent of iodine and bromine-containing compound represented by the general formula $RBr_nI_m$, where R is a fluorohydrocarbon group, a chlorofluorohydrocarbon group, a chlorohydrocarbon group or a hydrocarbon group and n and m each are 1 or 2, whereby the molecular weight can be adjusted to improve the processability.

The iodine and bromine-containing compound represented by the said general formula is selected from those which cannot lose the effects through side reactions under polymerization conditions, wherein R is selected from fluorohydrocarbon groups, chlorofluorohydrocarbon groups, chlorohydrocarbon groups or hydrocarbon groups generally having 1 to 10 carbon atoms, and each of the groups may have a functional group such as —O—, —S—, =NR, —COOH, —SO₂, —SO₃H, —PO₃H, etc.

Such iodine and bromine-containing compound may be a saturated or unsaturated linear or aromatic compound, wherein n and m each are preferably 1. The iodine and bromine-containing compound where at least one of n and m is 2 produces a fluorine-containing elastomer of three-dimensional structure, and thus is desirable to use within such a range as not to deteriorate the processability.

The linear iodine-containing bromine compound includes, for example, 1-bromo-2-iodoperfluoroethane, 1-bromo-3-iodoperfluoropropane, 1-bromo-4-iodoperfluorobutane, 2-bromo-3-iodoperfluorobutane, 1-bromo-2-iodoperfluoro(2-methylpropane), monobromomonoiodoperfluorocyclobutane, monobromomonoiodoperfluropentane, monobromomonoiodoperfluoro-n-octane, monobromomonoiodoperfluorocyclohexane, 1-bromo-1-iodo-2-chloroperfluoroethane, 1-bromo-2-iodo-2-chloroperfluoroethane, 1-iodo-2-bromo-2-chloroperfluoroethane, 1,1-dibromo-2-iodoperfluoroethane, 1, 2-dibromo-2-iodoperfluoroethane, 1,2-diiodo-2-bromoperfluoroethane, 1-bromo-2-iodo-1,2,2-trifluoroethane, 1-iodo-2-bromo-1, 2,2-trifluoroethane, 1-bromo-2-iodo-1,1-difluoroethane, 1-iodo-2-bromo-1,1-difluoroethane, 1-bromo-2-iodo-1-fluoroethane, 1-iodo-2-bromo-1-fluoroethane, 1-bromo-2-iodo-1,1,3,3,3-pentafluoropropane, 1-iodo-2-bromo-1,1,3,3,3-pentafluoropropane, 1-bromo-2-iodo-3,3,4,4,4-pentafluorobutane, 1-iodo-2-bromo-3,3,4,4,4-pentafluorobutane, 1,4-dibromo-2-iodoperfluorobutane, 2,4-dibromo-1-iodoperfluorobutane, 1,4-diiodo-2-bromoperfluorobutane, 1,4-dibromo-2-iodo-3,3,4,4,-tetrafluorobutane, 1,4-diiodo-2-bromo-3,3,4,4-tetrafluorobutane, 1,1-dibromo-2,4-diiodoperfluorobutane, 1-bromo-2-iodo-1-chloroethane, 1-iodo-2-bromo-1-chloroethane, 1-bromo-2-iodo-2-chloroethane, 1-bromo-2-iodo-1,1-dichloroethane, 1,3-dibromo-2-iodoperfluoropropane, 2, 3-dibromo-2-iodoperfluoropropane, 1,3-diiodo-2-bromoperfluoropropane, 1-bromo-2-iodoethane, 1-bromo-2-iodopropane, 1-iodo-2-bromopropane, 1-bromo-2-iodobutane, 1-iodo-2-bromobutane, 1-bromo-2-iodo-2-trifluoromethyl-3,3,3-trifluoropropane, 1-iodo-2-bromo-2-trifluoromethyl-3,3,3-trifluoropropane, 1-bromo-2-iodo-2-phenylperfluoroethane, 1-iodo-2-bromo-2- phenylperfluoroethane, 3-bromo-4-iodoperfluorobutene-1, 3-iodo-4-bromoperfluorobutene-1,1-bromo-4-iodoperfluorobutene-1,1-iodo-4-bromoperfluorobutene-1,3-bromo-4-iodo-3,4,4-trifluorobutene-1, 4-bromo-3-iodo-3,4,4-trifluorobutene-1,3-bromo-4-iodo-,1,1,2-trifluorobutene-1,4-bromo-5-iodoperfluoropentene-1,4-iodo-5-bromoperfluoropentene-1,4-bromo-5-iodo-1,1,1,2-trifluoropentene-1,4-iodo-5-bromo-1,1,2-trifluoropentene-1,1-bromo-2-iodo-perfluoroethyl perfluoromethyl ether, 1-bromo-2-iodoperfluoroethyl perfluoroethyl ether, 1-bromo-2-iodoperfluoroethyl perfluoropropyl ether, 2-bromo-3-iodoperfluoropropyl perfluorovinyl ether, 1-bromo-2-iodoperfluoroethyl perfluorovinyl ether, 1-bromo-2-iodoperfluoroethyl perfluoroallyl ether, 1-bromo-2-iodoperfluoroethyl methyl ether, 1-iodo-2-bromoperfluoroethyl methyl ether, 1-iodo-2-bromoethyl ethyl ether, 1-bromo-2-iodoethyl-2'-chloroethyl ether, etc. These iodine and bromine-containing compounds can be prepared according to an appropriate, known process; for example, a monobromomonoiodo, fluorine-containing olefin can be obtained by allowing a fluorine-containing olefin to react with iodine bromide.

The aromatic, iodine and bromine-containing compound includes, for example, benzenes having a substituent group such as 1-iodo-2-bromo, 1-iodo-3-bromo, 1-iodo-4-bromo, 3,5-dibromo-1-iodo, 3,5-diiodo-1-bromo, 1-(2-iodoethyl)-4-(2-bromoethyl), 1-(2-iodoethyl)-3-(2-bromoethyl), 1-(2-iodoethyl)-4-(2-bromoethyl), 3,5-bis(2-bromoethyl)-1-(2-iodoethyl), 3,5-bis(2-iodoethyl)-1-(2-bromoethyl), 1-(3-iodopropyl)-2-(3-bromopropyl), 1-(3-iodopropyl)-3-(3-bromopropyl), 1-(3-iodopropyl)-4-(3-bromopropyl), 3,5-bis(3-bromopropyl)-1-(3-iodopropyl), 1-(4-iodobutyl)-3-(4-bromobutyl), 1-(4-iodobutyl)-4-(4-bromobutyl), 3,5-bis(4-iodobutyl)-1-(4-bromobutyl), 1-(2-iodoethyl)-3-(3-bromopropyl), 1-(3-iodopropyl)-3-(4-bromobutyl), 3,5-bis-(3-bromopropyl)-1-(2-iodoethyl), 1-iodo-3-(2-bromoethyl), 1-iodo-3-(3-bromopropyl), 1,3-diiodo-5-(2-bromoethyl), 1,3-diiodo-5-(3-bromopropyl), 1-bromo-3-(2-iodoethyl), 1-bromo-3-(3-iodopropyl), 1,3-dibromo-5-(2-iodoethyl), 1,3-dibromo-5-(3-iodopropyl), etc., and perfluorobenzenes having a substituent group such as 1-iodo-2-bromo, 1-iodo-3-bromo, 1-iodo-4-bromo, 3,5-dibromo-1-iodo, 3,5-diiodo-1-bromo, etc.

During the polymerization reaction, the iodine and bromine of these iodine and bromine-containing compounds readily undergo radical cleavage under the action of an organic peroxide radical-generating source, and the monomers undergo addition growth reaction owing to the high reactivity of the generated radicals, and then the reaction is discontinued by withdrawing the iodine and bromine from the iodine and bromine-containing compound to give a fluorine containing elastomer having iodine and bromine at the molecule terminals. The iodine atom and bromine atom bonded to the molecule terminals also act as cross-linking sites for the peroxide vulcanization.

The iodine and bromine-containing compound is bonded to the fluorine-containing copolymer elastomer so that not more than about 5% by weight, generally about 0.001 to about 5% by weight, preferably about 0.01 to about 3% by weight in terms of iodine and bromine each may be contained in the resulting fluorine-containing copolymer elastomer.

The present fluorine-containing copolymer elastomer has a ηsp/c value of about 0.1 to about 2 dl/g, as measured by a method, which is described later, and can be cured by so far well known various vulcanization methods, for example, by peroxide vulcanization using an organic peroxide, polyamine vulcanization using a polyamine compound or a polyol vulcanization using a polyhydroxy compound, or by irradiation of radiation rays, electron beam, etc. Among them, peroxide vulcanization is particularly preferable, because it can give vulcanization products having distinguished resistances to chemicals, attrition and solvents, etc., where the cured elastomer has a good mechanical strength and the structure of cross-linked sites is in a stable carbon-carbon bond.

The organic peroxide for use in the peroxide vulcanization includes, for example, 2,5-dimethyl-2,5-bis(tert-butylperoxy)hexane, 2,5-dimethyl-2,5-bis(tert-butylperoxy)-hexine-3, benzoyl peroxide, bis(2,4-dichlorobenzoyl) peroxide, dicumyl peroxide, di-tert-butyl peroxide, tert-butyl cumyl peroxide, tert-butylperoxybenzene, 1,1-bis(tert-butylperoxy)-3, 5,5-trimethyl cyclohexane, 2,5-dimetylhexane-2,5-dihydroxyperoxide, α,ω'-bis(tert-butylperoxy)-p-diisopropylbenzene, 2,5-dimethyl-2,5-di(benzoylperoxy) hexane, tert-butylperoxy isopropyl carbonate etc.

In the peroxide vulcanization using the organic peroxide, a polyfunctional, unsaturated compound, such as tri(meth)allyl isocyanulate, tri(meth)allyl cyanulate, triallyl trimellitate, N,N'-m-phenylene bismaleimide, diallyl phthalate, tris(diallylamine)-s-triazine, trially phosphite, 1,2-polybutadiene, ethyleneglycol diacrylate, diethyleneglycol diacrylate, etc. can be usually used as a cocross-linking agent to obtain more distinguished vulcanization characteristics, mechanical strength and compression set.

The foregoing additive components to the peroxide vulcanization system are used in the following amounts: the organic peroxide is used in an amount of generally about 0.1 to about 10 parts by weight, preferably about 0.5 to about 5 parts by weight per 100 parts by weight of the fluorine-containing copolymer elastomer, and the cocross-linking agent is used in an amount of generally about 0.1 to about 10 parts by weight, preferably about 0.5 to about 5 parts by weight per 100 parts by weight of the fluorine-containing copolymer elastomer.

Furthermore, an inorganic filler such as carbon black, silica, etc.; an acid acceptor such as ZnO, CaO, $Ca(OH)_2$, MgO, PbO, synthetic hydrotalcite, etc; various pigments; a processing aid such as polyethyleneglycol monomethyl ether, Crown ether, etc.; a plasticizer such as $RfO[OCF(CF_3)CF_2O]nRf'$, $RfO[CF(CF_3)CF_2O]p(CF_2CF_2O)q(CF_2O)rRf'$, $RfO(CF_2CF_2O)n(CF_2O)mRf'$, $RfO(CF_2CF_2CF_2O)nRf'$, where Rf and Rf' each are a perfluoroalkyl group, a perfluoroalkyleneether triazine oligomer having $—(CFXOCF_2)a(CF_2)b(CF_2OCFX)c-$ in the molecule, where X is F or a $CF_3$ group (see JP-A-7-285948); a stabilizer, and other necessary additives can be appropriately added to the composition containing the above-mentioned components.

The present fluorine-containing copolymer elastomer can be further blended or cocross-linked with other substance having a peroxide cross-linkability such as silicone oil, silicone rubber, fluorosilicone rubber, fluorophosphazene rubber, ethylene-vinyl acetate copolymer, ethylene-acrylic acid ester copolymer, ethylene-propylene(-diene) copolymer rubber, acrylonitrile-butadiene copolymer rubber, acrylic acid ester rubber, etc.

The present composition can be prepared by kneading through rolls, a kneader, a Bambury mixer, etc., and its cross-linking is carried out by heating at about 140 to about 220° C. for about 5 to about 60 minutes. If required, secondary vulcanization is carried out preferably in air or in an inert atmosphere such as a nitrogen gas atmosphere at about 150 to about 250° C. for about 5 to about 50 hours.

The present fluorine-containing copolymer elastomer of tetrafluoroethylene having bromine groups as cross-linkable groups and specific perfluoro(vinylether) can give vulcanization products having distinguished resistances to chemicals, low temperature and heat. The present fluorine-containing copolymer elastomer can be produced at a good polymerization rate (good yield).

PREFERRED EMBODIMENTS OF THE INVENTION

The present invention will be described in detail below, referring to Examples and Comparative Example.

EXAMPLE 1

A stainless steel autoclave having a capacity of 500 ml was evacuated, and then the following compounds were charged in the autoclave:

| | |
|---|---|
| Distilled water | 200 ml |
| Ammonium perfluorooctanoate | 5 g |
| Potassium dihydrogen phosphate | 2 g |

Then, a monomer mixture consisting of the following monomers was charged into the autoclave under pressure to reach a pressure of 2.0 to 2.5 kg/cm$^2$ gauge:

| | |
|---|---|
| $CF_2=CF_2$ | [TFE] 64.3 mol. % |
| | (total amount as charged: 30 g) |
| $CF_2=CFO(CF_2)_2(OCF_2)_2OCF_3$ | [PFVE] 34.2 mol. % |
| | (total amount as charged: 66 g) |
| $CF_2=CFO(CF_2)_2Br$ | [FBrVE] 1.5 mol. % |
| | (total amount as charged: 1.9 g) |

Then, a polymerization temperature was increased to 40° C. to make the pressure reach about 4 kg/cm$^2$ gauge, and then 10 ml of an aqueous solution containing 0.5 g of ammonium persulfate and 0.1 g of sodium sulfite as dissolved therein was charged into the autoclave under pressure to initiate polymerization reaction. When the pressure was lowered to 3 kg/cm$^2$ gauge, the above-mentioned monomer mixture of the same composition was additionally charged into the autoclave until the pressure reached 4 kg/cm$^2$ gauge. Such operation was repeated. After the total amount of the monomer mixture was charged into the autoclave, the polymerization reaction was continued for 30 hours until the pressure was lowered to 1.2 kg/cm$^2$ gauge. The resulting latex was put into an aqueous sodium chloride solution to coagulate polymers, followed by washing with water and drying, whereby 65 g of terpolymer was obtained (polymerization rate: 66%).

It was found by $^{19}$F-NMR and elemental analysis that the resulting copolymer had a composition of 69.0 mol. % of TFE, 29.8 mol. % of PFVE and 1.2 mol. % of FBrVE. The copolymer also had a ηsp/c value of 0.8 dl/g [0.1 g dissolved in 100 ml of perfluoro(2-butyltetrahydrofuran)], and a Tg point of −39° C. (DSC method).

EXAMPLE 2

A stainless steel autoclave having a capacity of 500 ml was evacuated, and then the following compounds were charged into the autoclave:

| | |
|---|---|
| Distilled water | 200 ml |
| Ammonium perfluorooctanoate | 5 g |
| Potassium dihydrogen phosphate | 2 g |
| $ICH_2CH_2Br$ | 0.28 g |

Then, a monomer mixture consisting of the following monomers was charged into the autoclave under pressure to reach a pressure of 2.0 to 2.5 kg/cm$^2$ gauge:

| | |
|---|---|
| $CF_2=CF_2$ | [TFE] 64.3 mol. % |
| | (total amount as charged: 30 g) |
| $CF_2=CFO(CF_2)_2(OCF_2)_2OCF_3$ | [PFVE] 34.2 mol. % |
| | (total amount as charged: 66 g) |
| $CF_2=CFO(CF_2)_2Br$ | [FBrVE] 1.5 mol. % |
| | (total amount as charged: 1.9 g) |

Then, a polymerization temperature was elevated to 40° C. to make the pressure reach about 4 kg/cm$^2$ gauge, and then 10 ml of an aqueous solution containing 0.5 g of ammonium persulfate and 0.1 g of sodium sulfite as dissolved therein was charged into the autoclave under pressure to initiate polymerization reaction. When the pressure was lowered to 3 kg/cm$^2$ gauge, the above-mentioned monomer mixture of the same composition was additionally charged into the autoclave until the pressure reached 4 kg/cm$^2$ gauge. Such operation was repeated. After the total amount of the monomer mixture was charged into the autoclave, the polymerization reaction was continued for 40 hours until the pressure was lowered to 1.0 kg/cm$^2$ gauge. The resulting latex was put into an aqueous sodium chloride solution to coagulate polymers, followed by washing with water and drying, whereby 59 g of terpolymer was obtained (polymerization rate: 60%).

It was found by $^{19}$F-NMR and elemental analysis that the resulting copolymer had a composition of 70.2 mol. % of TFE, 28.7 mol. % of PFVE, 1.1 mol. % of FBrVE and 1 wt. % of I. The copolymer also had a ηsp/c value of 0.3 dl/g [0.1 g dissolved in 100 ml of perfluoro(2-butyltetrahydrofuran)], and a Tg point of −36° C. (DSC method).

EXAMPLE 3

A stainless steel autoclave having a capacity of 3 liters was flushed with a nitrogen gas and then evacuated, and the following compounds were charged into the autoclave:

| | |
|---|---|
| Distilled water | 1,800 ml |
| Ammonium perfluorooctanoate | 40 g |
| Potassium dihydrogen phosphate | 20 g |

Then, the autoclave was again flushed with a nitrogen gas and evacuated, and a monomer mixture consisting of the following monomers was charged into the autoclave:

| | |
|---|---|
| $CF_2=CF_2$ | [TFE] 32 g |
| $CF_2=CFO(CF_2)_2(OCF_2)_2OCF_3$ | [PFVE] 216 g |
| $CF_2=CFO(CF_2)_2Br$ | [FBrVE] 2.0 g |

Then, a polymerization temperature was elevated to 40° C., and 30 ml of an aqueous solution containing 2.0 g of ammonium persulfate and 0.4 g of sodium sulfite as dissolved therein was charged into the autoclave under pressure to initiate polymerization reaction. When a pressure reached 3.5 kg/cm$^2$ gauge, TFE was additionally charged into the autoclave until the pressure reached 4 kg/cm² gauge. Such operation was repeated. In that case, FBrVE was also charged into the autoclave at a rate of 0.4 g/hr. The polymerization reaction was continued for 9 hours. Then, 65 g of TFE and 3.6 g of FBrVE were further charged into the autoclave, and the reaction was continued for further one hour. After cooling, unreacted gases were purged from the autoclave and the resulting latex was put into an aqueous sodium chloride solution to coagulate polymers, followed by washing with water and drying, whereby 223 g of terpolymer was obtained (polymerization rate: 70%).

It was found by ¹⁹F-NMR and elemental analysis that the resulting copolymer had a composition of 72.0 mol. % of TFE, 27.1 mol. % of PFVE and 0.9 mol. % of FBrVE. The copolymer also had a ηsp/c value of 0.73 dl/g [0.1 g dissolved in 100 ml of perfluoro(2-butyltetrahydrofuran)], and a Tg point of −39° C. (DSC method).

Comparative Example

An autoclave having a capacity of 500 ml was evacuated and the following compounds were charged into the autoclave:

| | |
|---|---|
| Distilled water | 200 ml |
| Ammonium perfluorooctanoate | 5 g |
| Potassium dihydrogen phosphate | 2 g |

Then, a monomer mixture consisting of the following monomers was charged into the autoclave under pressure to reach a pressure of 2.0 to 2.5 kg/cm² gauge:

| | |
|---|---|
| $CF_2=CF_2$ | [TFE] 64.3 mol. % |
| | (total amount as charged: 30 g) |
| $CF_2=CFOCF_2CF(CF_3)OC_3F_7$ | [FP₂VE] 34.2 mol. % |
| | (total amount as charged: 69 g) |
| $CF_2=CFO(CF_2)_2Br$ | [FBrVE] 1.5 mol. % |
| | (total amount as charged: 1.9 g) |

Then, a polymerization temperature was elevated to 40° C. to make the pressure reach about 4 kg/cm² gauge, and 10 ml of an aqueous solution containing 0.5 g of ammonium persulfate and 0.1 g of sodium sulfite was charged into the autoclave under pressure to initiate polymerization reaction. When the pressure was lowered to 3 kg/cm² gauge, the above-mentioned monomer composition having the same composition was additionally charged into the autoclave until the pressure reached 4 kg/cm² gauge. Such operation was repeated. After the total amount of the monomer composition was charged into the autoclave, the polymerization reaction was continued for 30 hours until the pressure reached 1.2 kg/cm² gauge. The resulting latex was put into an aqueous sodium chloride solution to coagulate polymers, followed by washing with water and drying, whereby 45 g of terpolymer was obtained (polymerization rate: 45%).

It was found by ¹⁹F-NMR and elemental analysis that the resulting copolymer had a composition of 72.0 mol. % of TFE, 27.0 mol. % of FP₂VE and 1.0 mol. % of FBrVE. The copolymer also had a ηsp/c value of 0.8 dl/g [0.1 g dissolved in 100 ml of perfluoro(2-butyltetrahydrofuran)], and a Tg point of −24° C. (DSC method).

EXAMPLE 4

To 100 parts by weight each of the copolymers (fluorine-containing copolymer elastomers) obtained in the foregoing Examples 1 to 2 and Comparative Example were added the following compounds, followed by kneading through a two roll mill.

| | parts by weight |
|---|---|
| MT carbon black | 20 |
| 2,5-dimethyl-2,5-di(t-butylperoxy)hexane | 1.5 |
| Lead oxide (PbO) | 3 |
| Triallyl isocyanurate | 4 |

These resulting kneading products each were subjected to press vulcanization (primary vulcanization) at 180° C. for 10 minutes and then to oven vulcanization (secondary vulcanization) in a nitrogen atmosphere at 230° C. for 18 hours. The resulting vulcanization sheets were subjected to determination of normal state physical properties (according to DIN 53505 and 53504), evaluation of heat ageing resistance (measured as a percent tensile strength change before and after exposed in a gear oven at 230° C. for 70 hours) and resistance to low temperature (measured as Tg), and determination of compression set (according to ASTM D-395 Method B, at 200° C. for 70 hours). The results are given in the following Table.

TABLE

| | | Test No. | | |
|---|---|---|---|---|
| Fluorine-containing | | 1 | 2 | 3 |
| copolymer elastomer | | Ex. 1 | Ex. 2 | Comp. Ex. |
| Normal state physical properties | | | | |
| Hardness | (pts) | 72 | 73 | 73 |
| 100% modulus | (MPa) | 8.5 | 9.5 | 8.5 |
| Tensile strength | (MPa) | 20.1 | 20.5 | 10.0 |
| Elongation | (%) | 200 | 180 | 200 |
| Heat ageing resistance | | | | |
| Hardness change | (pts) | −1 | −2 | −1 |
| 100% modulus change | (%) | −30 | −25 | −30 |
| Tensile strength change | (%) | −20 | −5 | −25 |
| Elongation change | (%) | +10 | +25 | +15 |
| Compression set | (%) | 35 | 25 | 37 |
| Resistance to low temperature (Tg) | (°C.) | −37 | −35 | −22 |

What is claimed is:

1. A fluorine-containing copolymer elastomer, which comprises about 45 to about 80% by mole of tetrafluoroethylene, about 50 to about 20% by mole of a perfluoro(vinylether) represented by the following general formula:

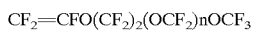
$CF_2=CFO(CF_2)_2(OCF_2)nOCF_3$ where n is an integer of 1 to 5, and about 0.2 to about 5% by mole of a bromine-containing unsaturated monomer compound, sum total being 100% by mole.

2. A fluorine-containing copolymer elastomer according to claim 1, wherein the bromine-containing unsaturated monomer compound is a brominated vinyl compound.

3. A fluorine-containing copolymer elastomer according to claim 2, wherein the brominated vinyl compound is a bromine-containing vinyl ether represented by the following general formula:

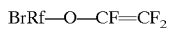
$BrRf-O-CF=CF_2$ where BrRf is a bromine-containing perfluoroalkyl group having 2 to 5 carbon atoms.

4. A fluorine-containing copolymer elastomer according to claim 1, where the bromine-containing unsaturated monomer compound is a brominated olefin.

5. A fluorine-containing copolymer elastomer according to claim 1, wherein the copolymer elastomer has a ηsp/c value of about 0.1 to about 3 dl/g, measured in a solution containing 0.1 g of the copolymer elastomer as dissolved in 100 ml of perfluoro(2-butyltetrahydrofuran).

* * * * *